(12) United States Patent
Malan

(10) Patent No.: US 11,750,745 B2
(45) Date of Patent: Sep. 5, 2023

(54) PROCESSING AND DISTRIBUTION OF AUDIO SIGNALS IN A MULTI-PARTY CONFERENCING ENVIRONMENT

(71) Applicant: Kelly Properties, LLC, Troy, MI (US)

(72) Inventor: D. Hugo Malan, Chicago, IL (US)

(73) Assignee: Kelly Properties, LLC, Troy, MI (US)

( * ) Notice: Subject to any disclaimer, the term of this patent is extended or adjusted under 35 U.S.C. 154(b) by 0 days.

(21) Appl. No.: 17/453,949

(22) Filed: Nov. 8, 2021

(65) Prior Publication Data

US 2022/0159125 A1    May 19, 2022

Related U.S. Application Data

(60) Provisional application No. 63/115,596, filed on Nov. 18, 2020.

(51) Int. Cl.
*H04M 3/56* (2006.01)
*H04R 1/10* (2006.01)

(52) U.S. Cl.
CPC .............. *H04M 3/568* (2013.01); *H04R 1/10* (2013.01)

(58) Field of Classification Search
CPC ......... H04M 3/568; H04R 1/10; H04R 5/033; H04R 27/00; H04R 2201/107; H04R 2430/01

See application file for complete search history.

(56) References Cited

U.S. PATENT DOCUMENTS

| | | | |
|---|---|---|---|
| 5,471,318 | A | 11/1995 | Ahuja et al. |
| 6,330,486 | B1 | 12/2001 | Padula |
| 6,392,760 | B1 | 5/2002 | Ahuja et al. |

(Continued)

FOREIGN PATENT DOCUMENTS

| | | |
|---|---|---|
| EP | 1381237 A2 | 1/2004 |
| EP | 3282669 B1 | 1/2020 |
| EP | 3936981 A1 | 1/2022 |

OTHER PUBLICATIONS

PCT International Search Report and Written Opinion for PCT/US2021/058760 filed Nov. 10, 2021 that claims priority to the instant application as the instant application; dated Mar. 3, 2022, 7 pages.

*Primary Examiner* — Akelaw Teshale

(74) *Attorney, Agent, or Firm* — HARNESS DICKEY & PIERCE P.L.C.

(57) ABSTRACT

A method for distributing audio signals among a plurality of communication devices includes, during an audio connection between a first user and a remote person, receiving a first outbound signal that encodes audio being transmitted to a remote communication device of the remote person from a first communication device corresponding to the first user. The method includes receiving a first inbound signal that encodes audio being transmitted to the first communication device from the remote communication device, receiving a set of outbound signals from at least one of the plurality of communication devices other than the first communication device, and generating a first combined signal by combining the set of outbound signals with the first inbound signal. The first combined signal excludes inbound signals transmitted to the plurality of communication devices other than the first communication device. The method includes transmitting the first combined signal to the first communication device.

20 Claims, 6 Drawing Sheets

(56) References Cited

U.S. PATENT DOCUMENTS

| | | |
|---|---|---|
| 6,850,496 B1 | 2/2005 | Knappe et al. |
| 7,006,616 B1 | 2/2006 | Christofferson et al. |
| 7,116,789 B2 | 10/2006 | Layton et al. |
| 7,200,214 B2 | 4/2007 | Knappe et al. |
| 7,346,654 B1 | 3/2008 | Weiss |
| 7,371,175 B2 | 5/2008 | Gilboy et al. |
| 7,634,533 B2 | 12/2009 | Rudolph et al. |
| 7,720,212 B1 | 5/2010 | Jouppi et al. |
| 7,756,274 B2 | 7/2010 | Layton et al. |
| 7,853,649 B2 | 12/2010 | Lee et al. |
| 7,894,830 B2* | 2/2011 | Rofougaran ............ G01S 19/49 |
| | | 455/456.6 |
| 8,072,479 B2 | 12/2011 | Valliath et al. |
| 8,082,297 B2 | 12/2011 | Syvain et al. |
| 8,156,184 B2 | 4/2012 | Kurata et al. |
| 8,170,193 B2 | 5/2012 | Curry et al. |
| 8,351,589 B2* | 1/2013 | Acero .................... H04R 27/00 |
| | | 709/204 |
| 8,403,751 B2 | 3/2013 | Boustead et al. |
| 8,406,439 B1* | 3/2013 | Bedingfield, Sr. .......................... |
| | | H04L 12/1827 |
| | | 381/310 |
| 8,416,715 B2 | 4/2013 | Rosenfeld et al. |
| 8,477,970 B2 | 7/2013 | Strub |
| 8,494,841 B2 | 7/2013 | Sandgren et al. |
| 8,503,655 B2* | 8/2013 | Sandgren ................ H04N 7/15 |
| | | 379/202.01 |
| 8,509,454 B2* | 8/2013 | Kirkeby .................. H04S 7/303 |
| | | 381/310 |
| 8,559,646 B2* | 10/2013 | Gardner .................. H04M 3/56 |
| | | 381/310 |
| 8,693,713 B2 | 4/2014 | Chen et al. |
| 8,717,408 B2 | 5/2014 | Khot et al. |
| 8,717,409 B2 | 5/2014 | Khot et al. |
| 8,718,301 B1 | 5/2014 | Jouppi et al. |
| 8,744,065 B2* | 6/2014 | Edholm ............... H04M 3/2281 |
| | | 379/265.06 |
| 8,781,818 B2 | 7/2014 | Janse et al. |
| 9,049,339 B2 | 6/2015 | Muench |
| 9,161,152 B2 | 10/2015 | Gleim |
| 9,165,073 B2 | 10/2015 | Kiraz et al. |
| 9,185,508 B2 | 11/2015 | Gleim |
| 9,197,755 B2* | 11/2015 | Gleim ...................... H04N 7/15 |
| 9,253,572 B2 | 2/2016 | Bedingfield, Sr. et al. |
| 9,299,352 B2* | 3/2016 | Seo ......................... H04S 5/00 |
| 9,319,820 B2 | 4/2016 | Boustead et al. |
| 9,420,109 B2 | 8/2016 | Boustead et al. |
| 9,432,790 B2 | 8/2016 | Raghuvanshi et al. |
| 9,466,278 B2 | 10/2016 | Rosedale et al. |
| 9,524,588 B2 | 12/2016 | Barzuza et al. |
| 9,525,958 B2 | 12/2016 | Gleim |
| 9,560,467 B2 | 1/2017 | Gorzel et al. |
| 9,565,314 B2 | 2/2017 | Cartwright et al. |
| 9,565,316 B2 | 2/2017 | Gleim |
| 9,584,915 B2 | 2/2017 | Fullam et al. |
| 9,592,451 B2 | 3/2017 | Hamilton, II et al. |
| 9,602,295 B1 | 3/2017 | Weiner et al. |
| 9,609,383 B1 | 3/2017 | Hirst |
| 9,622,011 B2 | 4/2017 | Seefeldt |
| 9,648,439 B2 | 5/2017 | Cartwright et al. |
| 9,674,453 B1 | 6/2017 | Tangeland et al. |
| 9,674,630 B1 | 6/2017 | Mateos Sole et al. |
| 9,743,213 B2 | 8/2017 | Mohammad et al. |
| 9,843,455 B2 | 12/2017 | Bathurst et al. |
| 9,883,140 B2 | 1/2018 | Johnson et al. |
| 9,961,473 B2 | 5/2018 | Schlecht et al. |
| 9,980,076 B1 | 5/2018 | Pratt et al. |
| 9,992,600 B2 | 6/2018 | Mateos Sole et al. |
| 9,998,711 B2 | 6/2018 | Safaei et al. |
| 10,007,482 B2 | 6/2018 | Nadler |
| 10,045,144 B2 | 8/2018 | Ballard et al. |
| 10,051,400 B2* | 8/2018 | McGrath .................. H04S 7/30 |
| 10,127,917 B2 | 11/2018 | Wright et al. |
| 10,142,484 B2 | 11/2018 | Spittle et al. |
| 10,251,013 B2 | 4/2019 | Bygrave |
| 10,278,003 B2 | 4/2019 | Satongar et al. |
| 10,334,384 B2* | 6/2019 | Sun ....................... H04M 3/565 |
| 10,346,128 B2 | 7/2019 | Vennstrom et al. |
| 10,362,421 B1 | 7/2019 | Lyren et al. |
| 10,382,879 B1 | 8/2019 | Akama et al. |
| 10,402,160 B2 | 9/2019 | Janus |
| 10,491,643 B2 | 11/2019 | Brown et al. |
| 10,496,358 B1 | 12/2019 | Hirst |
| 10,511,718 B2* | 12/2019 | Dickins ............. H04M 3/42221 |
| 10,514,885 B2 | 12/2019 | Leppanen et al. |
| 10,616,705 B2* | 4/2020 | Schmidt .................... G06F 3/167 |
| 10,656,782 B2* | 5/2020 | Seligmann ................ H04S 7/40 |
| 10,656,903 B1 | 5/2020 | Hirst |
| 10,721,521 B1 | 7/2020 | Robinson et al. |
| 10,735,858 B2 | 8/2020 | Sculley et al. |
| 10,735,884 B2 | 8/2020 | Audfray et al. |
| 10,743,124 B1 | 8/2020 | Nelson |
| 10,788,673 B2 | 9/2020 | Scott et al. |
| 10,834,359 B2 | 11/2020 | Sakai et al. |
| 10,863,300 B2 | 12/2020 | Jot et al. |
| 10,867,601 B2 | 12/2020 | Bulpin |
| 10,887,720 B2 | 1/2021 | Dicker |
| 10,952,006 B1 | 3/2021 | Krol et al. |
| 10,952,010 B2 | 3/2021 | Audfray et al. |
| 10,970,031 B2 | 4/2021 | McCoy et al. |
| 10,993,066 B2 | 4/2021 | Laaksonen et al. |
| 11,019,447 B2 | 5/2021 | Mateos Sole et al. |
| 11,109,178 B2 | 8/2021 | Terentiv et al. |
| 11,115,541 B2 | 9/2021 | Dickins et al. |
| 11,115,625 B1 | 9/2021 | Stuan et al. |
| 11,128,978 B2 | 9/2021 | Mason et al. |
| 11,146,905 B2 | 10/2021 | Thall et al. |
| 11,172,318 B2 | 11/2021 | Seefeldt |
| 2003/0053634 A1 | 3/2003 | McGrath et al. |
| 2003/0215103 A1 | 11/2003 | Norris et al. |
| 2007/0127668 A1 | 6/2007 | Ahya et al. |
| 2007/0253348 A1* | 11/2007 | Sammarco ............ H04W 88/06 |
| | | 370/352 |
| 2008/0159507 A1* | 7/2008 | Virolainen .......... H04M 1/72412 |
| | | 379/202.01 |
| 2008/0187143 A1 | 8/2008 | Mak-Fan |
| 2008/0260131 A1 | 10/2008 | Akesson |
| 2008/0298610 A1* | 12/2008 | Virolainen ............... H04S 7/302 |
| | | 381/300 |
| 2009/0052703 A1 | 2/2009 | Hammershoi |
| 2010/0328419 A1 | 12/2010 | Etter |
| 2011/0060435 A1 | 3/2011 | Lee et al. |
| 2011/0190911 A1 | 8/2011 | Iwanami et al. |
| 2012/0016926 A1 | 1/2012 | Toga et al. |
| 2012/0262536 A1 | 10/2012 | Chen et al. |
| 2014/0111599 A9* | 4/2014 | Yang .................. H04L 65/1101 |
| | | 348/14.08 |
| 2015/0054911 A1* | 2/2015 | Gottlieb .................. A63F 13/12 |
| | | 348/14.08 |
| 2015/0063553 A1* | 3/2015 | Gleim ...................... H04N 7/15 |
| | | 379/202.01 |
| 2015/0230040 A1* | 8/2015 | Squires .................... H04S 7/302 |
| | | 381/303 |
| 2016/0057558 A1 | 2/2016 | Gleim |
| 2016/0330563 A1 | 11/2016 | Chen et al. |
| 2016/0379660 A1 | 12/2016 | Wright et al. |
| 2017/0223476 A1* | 8/2017 | Breebaart ............. G10L 19/018 |
| 2018/0020313 A1 | 1/2018 | Morishita et al. |
| 2018/0048683 A1 | 2/2018 | Katekar et al. |
| 2018/0206038 A1 | 7/2018 | Tengelsen et al. |
| 2018/0249276 A1 | 8/2018 | Godfrey |
| 2018/0286416 A1* | 10/2018 | Lee ....................... G10L 19/008 |
| 2019/0342694 A1* | 11/2019 | Breebaart ............... H04S 3/004 |
| 2019/0364379 A1* | 11/2019 | Davidson ................ H04S 7/304 |
| 2019/0385629 A1 | 12/2019 | Moravy et al. |
| 2020/0037097 A1 | 1/2020 | Torres et al. |
| 2020/0059561 A1 | 2/2020 | Murali et al. |
| 2020/0077222 A1 | 3/2020 | Nguyen et al. |
| 2020/0099792 A1 | 3/2020 | Nguyen et al. |
| 2020/0169824 A1* | 5/2020 | McGrath .................... H04S 3/02 |
| 2020/0288263 A1 | 9/2020 | Tomlin et al. |
| 2020/0389754 A1 | 12/2020 | Prasso |
| 2021/0006924 A1 | 1/2021 | Terentiv et al. |

(56) References Cited

U.S. PATENT DOCUMENTS

| | | |
|---|---|---|
| 2021/0011682 A1 | 1/2021 | Vennstrom et al. |
| 2021/0044913 A1 | 2/2021 | Haussler et al. |
| 2021/0084357 A1 | 3/2021 | Tajik et al. |
| 2021/0152970 A1 | 5/2021 | Jot et al. |
| 2021/0168550 A1 | 6/2021 | Terentiv et al. |
| 2021/0194942 A1 | 6/2021 | Kane |
| 2021/0195356 A1 | 6/2021 | Oh et al. |
| 2021/0258713 A1 | 8/2021 | Tajik |
| 2021/0266696 A1 | 8/2021 | Lee et al. |
| 2021/0274305 A1 | 9/2021 | Eronen et al. |
| 2021/0297804 A1 | 9/2021 | Walker et al. |
| 2021/0337336 A1 | 10/2021 | Gray |
| 2021/0352426 A1 | 11/2021 | Mateos Sole et al. |
| 2021/0385263 A1 | 12/2021 | Churchill |
| 2021/0400415 A1 | 12/2021 | Thall et al. |
| 2022/0159214 A1 * | 5/2022 | Gorny .................. H04M 3/567 |

* cited by examiner

PROCESSING AND DISTRIBUTION OF AUDIO SIGNALS IN A MULTI-PARTY CONFERENCING ENVIRONMENT

CROSS-REFERENCE TO RELATED APPLICATION

This application claims the benefit of U.S. Provisional Application No. 63/115,596, filed Nov. 18, 2020. The entire disclosure of the above application is incorporated herein by reference.

FIELD

The present disclosure relates to teleconference systems and more particularly to telephony systems to process and distribute audio signals in a multi-party conferencing environment.

BACKGROUND

In a physical office space for a business (e.g., a call center, etc.), employees of the business who work at the office (e.g., staffing recruiters, salespeople, etc.) often benefit from overhearing conversations among their colleagues at the office, as well as one side of the conversations their colleagues are having (e.g., via phone, etc.) with individuals external to the business (e.g., potential recruits, potential clients, etc.). However, when employees work virtually, they lose these important elements of working in the office with their colleagues, including overhearing their colleagues talk.

In a distributed call center, one or more employees may work remotely (for example, from home), such that they are physically distanced from other colleagues. The inability to hear conversations among their colleagues and between their colleagues and individuals external to the business can slow mentoring, create friction in spreading information among employees, and prevent beneficial discoveries arising from overheard conversations.

For example, a salesperson at the call center might overhear a recruiter stationed nearby at the call center talking to a candidate about the candidate's skills and realize one of the recruiter's clients is looking for these skills. Or, a recruiter at the call center might overhear a salesperson stationed nearby at the call center talking to a client about the client's requirements and realize, based on what the salesperson is saying to the client, that the recruiter recently spoke to a perfect candidate for the client's requirements. Or, in a more indirect fashion, a junior recruiter might overhear what a senior recruiter is saying to potential recruits and learn from the senior recruiter about how to manage a complex client/candidate interaction. Or, a manager might overhear what a salesperson is saying to a potential client and identify a potential coaching opportunity for the salesperson based on how the manager hears the salesperson interact with the potential client.

Conventional teleconferencing systems allow a group of colleagues to have a conference call. These systems, however, are typically only useful when the group is discussing internal matters amongst itself and are not suitable for use when one or more of the colleagues desires to separately converse with an individual outside the business. Even within a conference call, it can be difficult to discern which colleague in the group is speaking on the conference call or to otherwise focus on what a particular colleague is saying, especially as the number of colleagues participating in the conference call increases.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A method for distributing audio signals among a plurality of communication devices that respectively correspond to a plurality of users includes, during an audio connection between a first user of the plurality of users and a remote person, receiving a first outbound signal. The first outbound signal encodes audio being transmitted to a remote communication device of the remote person from a first communication device of the plurality of communication devices. The first communication device corresponds to the first user. The method includes receiving a first inbound signal. The first inbound signal encodes audio being transmitted to the first communication device from the remote communication device. The method includes receiving a set of outbound signals from at least one of the plurality of communication devices other than the first communication device, and generating a first combined signal by combining the set of outbound signals with the first inbound signal. The first combined signal excludes inbound signals transmitted to the plurality of communication devices other than the first communication device. The method includes transmitting the first combined signal to the first communication device.

In other features, the method includes forwarding the first outbound signal to the remote communication device. In other features, the method includes generating a second combined signal by combining the set of outbound signals excluding a second outbound signal. The second outbound signal encodes audio encodes audio from a second communication device corresponding to a second user. The method includes transmitting the second combined signal to the second communication device.

In other features, generating the first combined signal includes combining the set of outbound signals with corresponding time delays for a subset of outbound signals included in the first combined signal. In other features, the corresponding time delays prevent the set of outbound signals included in the first combined signal from overlapping. In other features, the method includes, for each outbound signal of the set of outbound signals included in the first combined signal, adjusting a volume of the corresponding outbound signal based on the first inbound signal.

In other features, adjusting the volume of the corresponding outbound signal of the set of outbound signals includes implementing a machine learning algorithm to normalize each outbound signal of the set of outbound signals included in the first combined signal. In other features, the method includes transmitting the first outbound signal to a set of remote communication devices.

In other features, the first communication device includes binaural headphones for receiving the first combined signal, and a microphone for transmitting the first outbound signal. In other features, the method includes assigning a first side or a second side of the binaural headphones to each outbound signal of the set of outbound signals included in the first combined signal. The corresponding outbound signal is projected from the assigned first side or second side.

A system for distributing audio signals among a plurality of communication devices that respectively correspond to a plurality of users, includes at least one processor, and a memory coupled to the at least one processor. The memory stores instructions for execution by the at least one processor, and the instructions include, during an audio connection between a first user of the plurality of users and a remote person, receiving a first outbound signal. The first outbound signal encodes audio being transmitted to the remote person from a first communication device corresponding to the first user. The instructions include receiving a first inbound signal. The first inbound signal encodes audio being transmitted to the first user from a remote communication device of the remote person. The instructions include receiving a set of outbound signals from at least one of the plurality of communication devices other than the first communication device, and generating a first combined signal by combining the set of outbound signals with the first inbound signal. The first combined signal excludes inbound signals transmitted to the plurality of communication devices other than the first communication device. The instructions include transmitting the first combined signal to the first communication device.

In other features, the instructions include transmitting the first outbound signal to the remote communication device corresponding to the remote person. In other features, the instructions include generating a second combined signal by combining the set of outbound signals excluding a second outbound signal. The second outbound signal encodes audio encodes audio from a second communication device corresponding to a second user, and the instructions include transmitting the second combined signal to the second communication device.

In other features, generating the first combined signal includes combining the set of outbound signals with corresponding time delays for a subset of outbound signals included in the first combined signal. In other features, the corresponding time delays prevent the set of outbound signals included in the first combined signal from overlapping.

In other features, the instructions include, for each outbound signal of the set of outbound signals included in the first combined signal, adjusting a volume of the corresponding outbound signal based on the first inbound signal. In other features, adjusting the volume of the corresponding outbound signal of the set of outbound signals includes implementing a machine learning algorithm to normalize each outbound signal of the set of outbound signals included in the first combined signal.

In other features, the instructions include transmitting the first outbound signal to a set of remote communication devices. In other features, the first communication device includes binaural headphones for receiving the first combined signal, and a microphone for transmitting the first outbound signal. In other features, the instructions include assigning a first side or a second side of the binaural headphones to each outbound signal of the set of outbound signals included in the first combined signal. The corresponding outbound signal is projected from the assigned first side or second side.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Introduction

Figure 1A:
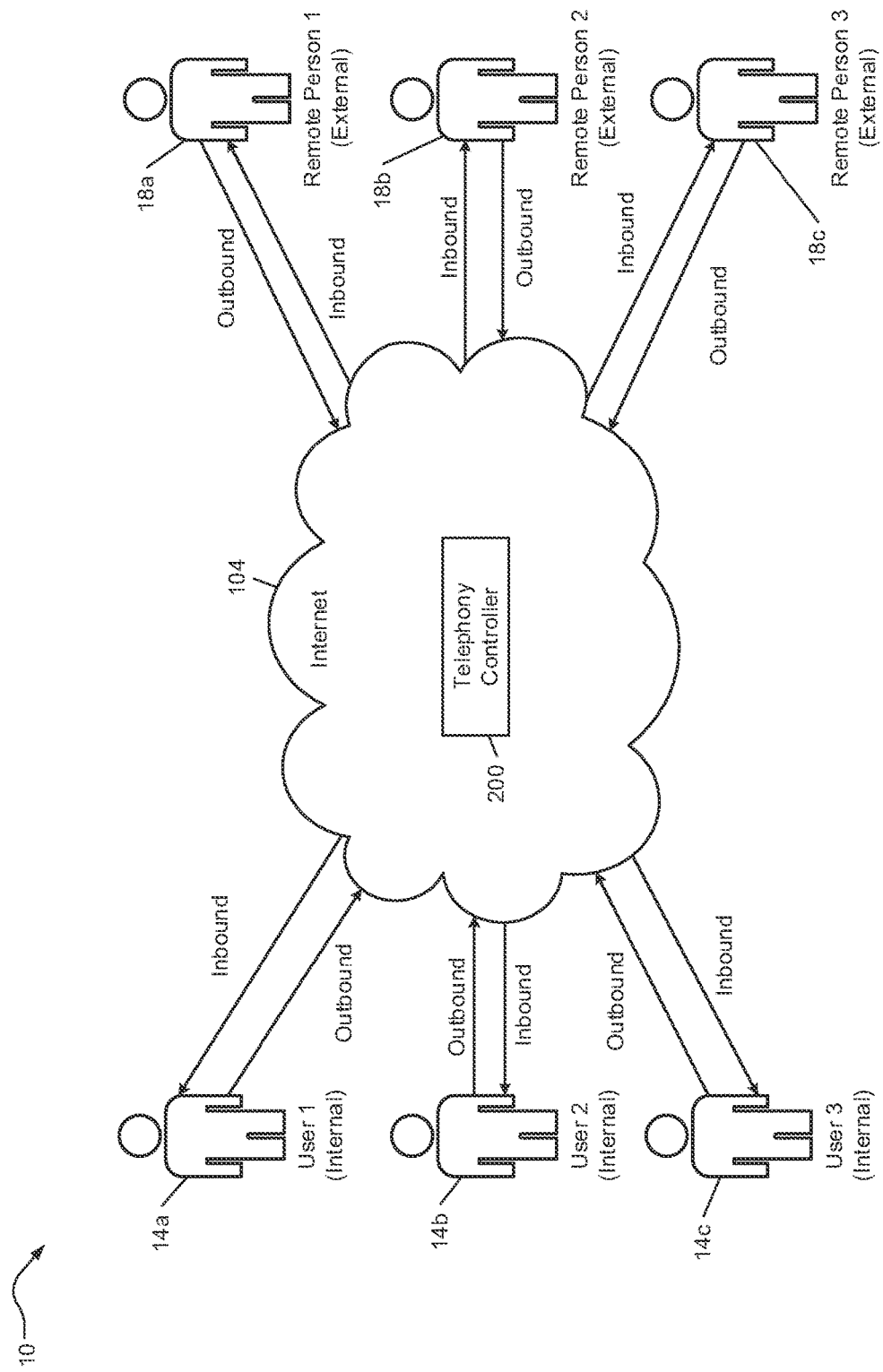
FIG. 1A is a graphical depiction of example environment in which an example telephony controller may be implemented for processing and distributing audio signals.

In a distributed environment, each person may be working separately from some or all of their colleagues, which deprives them of the benefit of hearing interactions with their colleagues. This can slow mentoring, create friction in spreading information among colleagues, and prevent chance discoveries from overheard conversations (for example, a potential customer with a need that another salesperson is uniquely qualified to address).

In various implementations, each person using a system of the present disclosure has binaural headphones and a microphone (which may be integrated with the headphones) for communicating with callers and with each other. The disclosure allows an organization to identify teams and pipe the microphone feeds of all team members into the headsets of each of the team members. In various implementations, the first person will be able to hear their team members' sides of the conversation, but not the other team members' callers.

For example, considering a first person in a team, the microphone feeds from all the other team members to the headphones of the first person. The feeds from the team members will be reduced in volume compared to the voice of the caller the first person is speaking with.

A virtual room could be laid out with virtual positions defined for each team member. The audio would be processed to make it sound to the first team member as if the microphone feed of another team member is coming from the virtual position of the team member. For a larger team, the virtual room would be larger, just as a physical room would be. Then, not just direction but also attenuation may be employed to distinguish among team members. Team members sitting further away from each other will be softer in their respective headsets. In addition to or alternatively to placement within the virtual 3D space, team members' voices may be adjusted, such as by increasing or decreasing pitch, to make them more easily distinguishable from each other.

To account for different voice volumes, a machine learning model may be trained on each user's voice to learn regular speech volumes and normalize speech accordingly. For example, a user may speak loudly when more confident and more quietly at other times. The trained machine learning model may recognize these two regimes and scale the user's voice differently in each to achieve a more uniform average volume. Then, different users' voices may be normalized to each other so that a loud talker will not drown out a soft talker in the mixed feed.

Each microphone feed can be monitored to determine an average and standard deviation of volume of speech—this may be done by training a machine learning model. Then the person's voice can be normalized based on their average volume and compressed based on their standard deviation of volume. This prevents a loud talker from overpowering a soft talker.

Further, each person's voice may be subject to dynamic compression or at least dynamic clipping (limiting loud noises) to prevent startling and interruptions if someone's voice is raised or if a loud noise (such as a cough or door slam) is picked up. In various implementations, each person may have a physical or software mute function to allow their voice to not be broadcast to their team members in order to allow for private conversations. Further, each person may be able to temporarily silence the surrounding conversations as necessary. In various implementations, a portal (such as a web portal) can allow each person to tailor the microphone injection parameters. For example, a person may select who their team members are, and may adjust volume or mute altogether certain colleagues. The portal may allow the person to adjust the virtual location of their colleagues in 3D space and apply other filters, such as pitch increase or decrease.

Combining and supplying the microphone feeds to the team members may occur with a single logical device (referred to as a telephone controller) that may be placed at a single location or distributed across multiple locations. The locations may include a locally-hosted private branch exchange (PBX), a cloud PBX, or a cloud hosting provider, such as Amazon Web Services (AWS). In various implementations, some functions may be performed locally at a user's phone. For example, injection of sidetone (where a user can hear their own voice coming back through their headphones at a reduced volume) may be performed locally to avoid any delay or distortion. Further, the voice of the user's caller may be combined locally with a cumulative feed of all the other team members to minimize the delay of the caller's voice. Meanwhile, even substantial amounts of delay, as long as the delay is not variable, is okay for the receipt of other team members' conversations since they are just being overheard, not participated in.

FIG. 1A is a high-level graphical depiction of example telephony controller system 10. The telephony controller system 10 demonstrates multiple, simultaneous conversations occurring between a plurality of internal users 14 and a plurality of external users 18. The plurality of internal users 14 include a first user 14*a*, a second user 14*b*, and a third user 14*c*. The plurality of external users 18 include a first remote person 18*a*, a second remote person 18*b*, and a third remote person 18*c*. While three internal and external users are shown, fewer or additional internal and external users may be communicating simultaneously using the telephony controller system 10.

The telephony controller system includes a telephony controller 200. In various implementations, the plurality of internal users 14 may be employees at a single company and connected to each other internally. The plurality of external users 18 may be customers or other individuals with whom the plurality of internal users 14 are communicating via a communication network 104, for example, using Internet telephony, such as Voice over Internet Protocol (VoIP), etc. An example communication network 104 includes the Internet. In various implementations, the communication network 104 may include an alternative type of network, such as a public switch telephone network (PSTN), etc.

The telephony controller system 10 includes an outbound communication signal for each user and an inbound communication signal for each user. In various implementations, a user may be generating multiple outbound communication signals, for example, by speaking into more than one microphone. Similarly, a user may be listening to multiple inbound communication signals via a communication device, such as one or more speakers, headphones, or telephones. If the system includes multiple microphones to generate multiple outbound communication signals, the multiple outbound communication signals will be a composite communication signal that combines the different signals from each microphone. However, the combined outbound communication signals may still be subsequently separated. Similarly, if the system includes multiple speakers to receive multiple inbound communication signals, the inbound communication signals are combined into a composite inbound communication signal, which can be separated and delivered to each speaker.

In various implementations, the composite inbound communication signal or the combined outbound communication signals may be combined or aggregated at one or more of the communication devices. For example, a headset may receive individual outbound communication signals and combine those outbound communication signals (excluding the outbound communication signal received by the headset) for the corresponding user to listen to the combined signals.

The telephony controller 200 has complete access to all outbound communication signals and can control or alter all inbound communication signals. Further, the telephony controller 200 may execute, in real-time, a variety of transformations on the outbound communication signals or the separate components if the outbound communication signal is a composite communication signal. The types of transformations of outbound communication signals include: cloning outbound communication signals or components; introducing time delays relative to other outbound communication signals or components; altering the pitch of outbound communication signals or components; suppressing or amplifying some frequency ranges relative to others in the outbound communication signals or components; changing the volume of outbound communication signals or components relative to other outbound communication signals or components; etc.

The telephony controller 200 can further execute, in real-time, a variety of inbound communication signals or the separate components if the inbound communication signal is a composite communication signal. The types of transformation of inbound communication signals include the list of outbound communication signal transformations above as well as adding outbound (or other inbound) communication signals or components onto an inbound communication signal. In various implementations, the addition may occur after the application of one or more transformations to the outbound (or other inbound) communication signals or components.

The telephony controller 200 receives instructions from a processor or one or more modules instructing the transformations to perform on the outbound communication signals and the inbound communication signals. The telephony controller 200 can also receive input in real-time to instruction the performance of particular transformations. For example, the telephony controller 200 may receive an instruction to vary a time delay introduced between signal components in real-time based on the spatial positioning of physical components.

In various implementations, the telephony controller system 10 and telephony controller 200 may implement basic co-listening. In basic co-listening, the first user 14a may listen to the outbound communication signals of each of the plurality of internal users 14, along with listening to their conversation. In this way, the first user 14a is hearing the conversations of the plurality of internal users 14 as if they were in the same room. For example, the telephony controller system 10 and telephony controller 200 may generate a virtual room where each user 14 is located at a different position in the virtual room (e.g., using an XAudio2 library for positioning, etc.). A user interface may allow a system administrator to configure positions of the users 14 in the virtual room, such as positions corresponding to previous locations of users in a physical office environment.

One or more virtual rooms may be created, with any suitable number of users 14 assigned to each room. For example, the telephony controller system 10 and telephony controller 200 could be designed to support 2 virtual rooms with a maximum of eight users per room. In other embodiments, more or less virtual rooms may be supported, with more or less maximum users per room.

To implement basic co-listening, the telephony controller system 10 includes at least one microphone and at least one speaker for each internal user and each external user. In implementation, the telephony controller 200 adds the outbound communication signals of each of the plurality of internal users 14 onto a first inbound communication signal of the first user 14a. The added outbound communication signals may be at a lower volume than the first inbound communication signal or the first user 14a may adjust the volume of each communication signal in real-time via a first controller provided to the first user 14a.

A corresponding controller may be provided to each user to adjust volume, mute, etc. In various implementations, the telephony controller 200 may implement a machine learning algorithm to adjust volume based on the first user's volume history or proportionally to the first inbound communication signal. In various implementations, the telephony controller 200 may also provide the inbound communication signals of the plurality of internal users 14, supplying both sides of the conversation (that is, the outbound communication signals of the plurality of external users 18).

In various implementations, the telephony controller system 10 and the telephony controller 200 may capture audio from one or more applications, to combine audio from multiple internal users 14 and/or external users 18. For example, the telephony controller system 10 and the telephony controller 200 may capture audio from one or more third party applications, where each instance of captured audio (or each third party application audio source) is incorporated as a separate audio stream among the outbound and/or inbound communication signals.

The telephony controller system 10 and the telephony controller 200 may use filtering or other suitable techniques to inhibit an echo associated with capturing audio. In various implementations, a codec (such as an Opus codec and pipeline) may be used for data compression for the captured audio.

The telephony controller system 10 and the telephony controller 200 may also implement spatially separated co-listening. Spatially separated co-listening is similar to basic co-listening with outbound communication signals from the plurality of internal users 14 including a unique time delay along with assigning different outbound communication signals to alternate between a left and a right speaker of the first user 14a. The telephony controller 200 includes the time delay for the outbound communication signals and alternates between the left and the right speaker to allow the first user 14a to better distinguish between outbound communication signals of other internal users.

To implement spatially separated co-listening, the system includes one microphone and one speaker for each of the plurality of external users 18 along with one microphone and two stereo speakers for each of the plurality of internal users 14. The plurality of internal users 14 each have a left and right stereo speaker to create the perception that the individual outbound communication signals (of the plurality of internal users 14 or the plurality of external users 18) are being heard from different spatial directions. The multiple speakers along with the time delay helps the first user 14a to distinguish between different communication signals.

In various implementations, the telephony controller system 10 may implement spatially separated co-listening using binaural headphones for the plurality of internal users 14. The binaural headphones provide a planar coordinate system anchored to the internal user's head, changing the apparent sound directions of the outbound communication signal based on the orientation of the internal user's head.

In various implementations, the telephony controller system 10 may implement spatially separated co-listening using orientation-tracked binaural headphones, similar to headphones used in virtual reality headsets. The orientation-tracked binaural headphones provide a planar coordinate system while allowing the coordinate system to be fixed independent of the orientation of the internal user's head by varying the time delay between the outbound communication signals to compensate for changes in orientation of the head. For example, the apparent sound directions do not move with changes in the internal user's head.

In various implementations, the telephony controller system 10 may implement spatially separated co-listening using multiple external speakers, providing more complex spatial positioning. Multiple external speakers provide apparent spatial directions above or below the internal user. Further, multiple external speakers create a coordinate system that is independent of the orientation of the internal user's head.

In various implementations, the telephony controller system 10 may implement spatially separated co-listening using an orientation-tracked microphone or with multiple external microphones, allowing external users to speak more directly to a particular person by turning in the particular person's "virtual" direction.

The telephony controller system 10 and the telephony controller 200 may also implement timbre separated co-listening. Timbre separated co-listening is implemented similar to basic co-listening and spatially separated co-listening but further transforms one or more of pitch, frequency mix, volume, etc. of the outbound communication signals. Timbre separated co-listening accounts for pitch, frequency mix, etc. to assist the first user 14a in differentiating the various outbound communication signals due the difference in pitch, sound quality, volume, etc. of the various internal or external users being heard. In various implementations, timbre separated co-listening sound transformations can be selected to match the auditory capacity of the first user 14a (for example, to compensate for high frequency hearing loss later in life).

In various implementations, the telephony controller system 10 and the telephony controller 200 may create a spatial effect by mixing audio sources from various users, such as two or more of the internal users 14 and/or the external users 18. For example, digital signal processors (DSPs) or DSP applications may be used to mix audio sources, such as DSP applications installed on a laptop or other suitable computing device.

The telephony controller system 10 and the telephony controller 200 may also implement video synchronized co-listening when the plurality of internal users 14 and the plurality of external users 18 are also using video screens and cameras. When implementing video synchronized co-listening, the telephony controller system 10 synchronizes the video signal corresponding to the presently heard outbound communication signal to match the timing of the outbound communication signal. Video synchronized co-listening further assists the first user 14a because the first user 14a can see who is speaking and how the speaker's facial movements correspond to the sounds the first user 14a is hearing. In various implementations, real-time AI-driven transcriptions of the additional outbound communication signals can be displayed over the videos or in text windows to make individual conversations easier to follow.

In various implementations, the telephony controller system 10 and the telephony controller 200 may include one or more DSP applications, server applications, etc. The telephony controller system 10 and/or the telephony controller 200 may act as a network controller that provides one or more control channel application programming interfaces (APIs). For example, the telephony controller system 10 and/or the telephony controller 200 may be used to control parameters, assignments, etc. of incoming and outgoing voice channels for each user 14, and the APIs may allow a system administrator or other system component to modify settings or control implemented by the telephony controller system 10 and/or the telephony controller 200.

In some embodiments, an application (such as a server application) may provide a socket transport implementation. The socket transport implementation may provide various processing features, such as voice data processing, control data processing, etc. In various implementations, a client application may handle incoming requests, such as accepting and disconnecting clients (e.g., the internal users 14 and/or external users 18).

An application may redirect voice traffic between clients, redirect control traffic between clients, etc. For example, an end-user of the application may be able to create a virtual room, connect to the virtual room from a local computing device, and configured individual positions for each user (such as each internal user 14). The application may allow a client to hear audio streams from all participants according to a specified configuration (e.g., a configuration of the virtual room), and hear audio streams from a participant's call in a third application. The client may be able to leave the virtual room when desired or necessary.

In various implementations, the system 10 and/or telephony controller 200 may record audio of one or more of the internal users 14 and/or external users 18. For example, an audio stream from an internal user 14 may be recorded and stored for playback at a later time. The time between the recording and playback may be very short, such as to introduce a short time delay, or may be spaced apart by more significant time periods (e.g., if a recorded audio stream is played back later in the day or even on a subsequent day, such as for training purposes).

If internal users 14 work at different times of the day (or on different days), recorded audio from one internal user 14 at a prior point in time may be played back to another internal user (e.g., as part of a combined communication signal). While the later user 14 may not be able to act on the played back audio in real time because the recorded audio occurred earlier, the played back audio may alert the later user 14 to follow up with the prior user 14 that generated the recorded audio (e.g., if the later user notices an important related piece of information while listening to the played back audio).

Figure 1B:
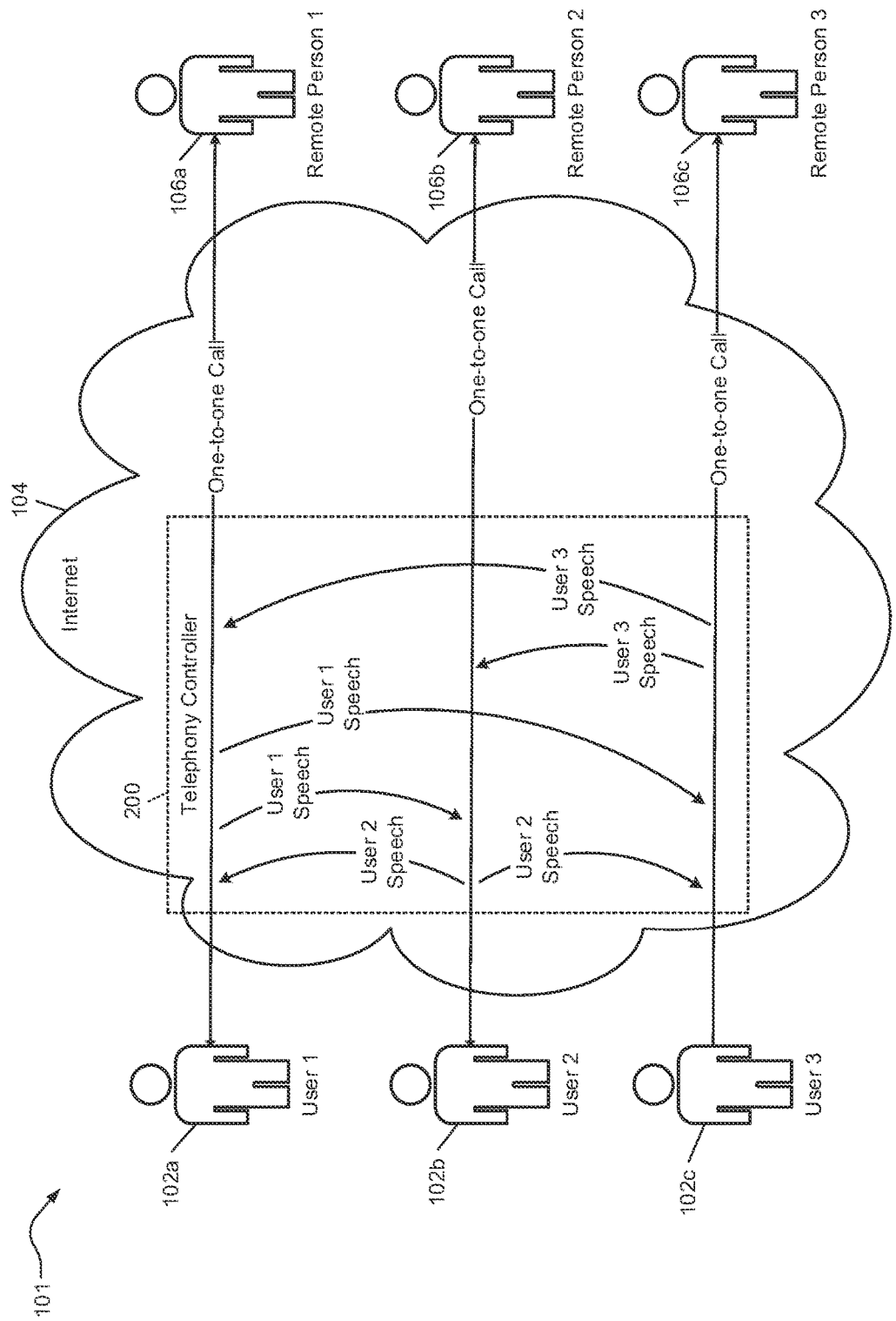
FIG. 1B is another graphical depiction of example environment in which an example telephony controller may be implemented for processing and distributing audio signals.

FIG. 1B is another graphical depiction of an example environment 101 including a telephony controller 200. Example implementations of the telephony controller 200 are described in greater detail below in reference to FIGS. 2-4.

In FIG. 1B, the environment 101 includes a team of first, second, and third users 102a, 102b, and 102c (collectively, users 102), a communication network 104, and first, second, and third remote persons 106a, 106b, and 106c (collectively, remote persons 106). The telephony controller 200 is implemented in the environment 101 via a connection with (or as part of) the communication network 104.

The three different users 102 may be employees of a business having a distributed call center, with each employee working virtually at a different physical location (for example, teleconferencing, from the employee's personal residence, with different potential customers or recruits of the business, etc.). In various environments, the number of users may be more or less than three. Further, the users need not be part of a defined team, employees of any particular business or entity, or work at a distributed call center. In FIG. 1B, each user 102 is a participant in a conference carried out over the communication network 104 between the user 102 and a different remote person 106 who is not part of the team VoIP.

A telephony controller implemented in the environment 101 may be configured to facilitate, via the communication network 104, a conference between each user 102 and each corresponding remote person 106. For example, the first user 102a is a participant in a conference facilitated by the telephony controller between the first user 102a and the first remote person 106a. The second user 102b is a participant in a difference conference facilitated by the telephony controller between the second user 102b and the second remote person 106b. And, the third user 102c is a participant in still a different conference facilitated by the telephony controller between the third user 102c and the third remote person 106c.

The example conferences between the users 102 and corresponding remote persons 106 are teleconferences, and the teleconferences are one-to-one telephone calls between the users 102 and the corresponding remote persons 106, such that the only participants in each call are the corresponding user 102 and remote person 106. In various environments, a conference may be carried out in one or more other manners, such as using a PSTN. In various implementations, a conference is one-to-one, one-to-many, many-to-one, or many-to-many. Further, a conference may involve one or more other types of media, such as a video. In various implementations, the first user 102a may be in a conference with a remote person, but the second and third users 102b and 102c might not be in any conferences with any remote persons.

The telephony controller 200 is configured to, for each user 102 of the team, distribute to the user 102 the speech (outbound communication signal) of each of the other users 102 of the team, in addition to the speech of the corresponding remote person 106 in the one-to-one call with the user 102, while isolating from the user 102 the speech of each other remote person 106. Therefore, the user 102 can only hear speech of other users on the user's team. The telephony controller 200 is also configured to, for each remote person 106, transmit to the remote person 106 only the speech of the corresponding user 102.

For example, when implemented in the environment 101, the telephony controller 200 may be configured to distribute to the first user 102a the speech of the second and third users 102b and 102c, in addition to the speech of the first remote person 106a in the one-to-one conference with the first user 102a, while isolating from the first user 102a the speech of the second and third remote persons 106b and 106c. The telephony controller 200 may also be configured to transmit to the first remote person 106a the speech of the first user 102a (in the conference between the first user 102a and the first remote person 106a), while isolating from the first remote person 106a the speech of the second and third users 102b and 102c (in the one-to-one conferences between the second and third users 102b and 102c and the second and third remote persons 106b and 106c).

As another example, the telephony controller 200 may be configured to distribute to the second user 102b the speech of the first and third users 102a and 102c, in addition to the speech of the second remote person 106b in the one-to-one conference with the second user 102b, while isolating from the second user 102b the speech of the first and third remote persons 106a and 106c. The telephony controller 200 may also be configured to transmit to the second remote person 106b the speech of the second user 102b (in the conference between the second user and the second remote person), while isolating from the second remote person the speech of the first and third users (in the one-to-one conferences between the first and third users and the first and third remote persons).

As a further example, the telephony controller 200 may be configured to distribute to the third user 102c speech of the first and second users 102a and 102b, in addition to the speech of the third remote person 106c in the one-to-one conference with the third user 102c, while isolating from the third user 102c the speech of the first and second remote persons 106a and 106b. The telephony controller 200 may also be configured to transmit to the third remote person 106c the speech of the third user 102c (in the conference between the third user 102c and the third remote person 106c), while isolating from the third remote person 106c the speech of the first and second users 102a and 102b (in the one-to-one conferences between the first and second users 102a and 102b and the first and second remote persons 106a and 106b). The telephony controller 200 can be similarly configured for any desirable number of users.

In this manner, the telephony controller 200 enables the team of users 102 (potentially, dispersed throughout a city, state, country, or even world) to privately co-listen/overhear and/or converse with one another as desired. At the same time, the telephony controller 200 enables each user 102 of the team to participate in a conference with a remote person 106 that is not part of the team, where such conference with the remote person 106 is semi-isolated (with respect to the speech of the remote person 106) from the other users 102 of the team.

In various implementations, the telephony controller 200 enables each user 102 of the team to readily differentiate the speech of each of the other users 102 of the team based on audio processing involving, among other things, volume control, three-dimensional (3D) speech localization, attenuation, normalization, and/or pitch adjustment. Further, the telephony controller 200 may enable each user 102 of the team to provide user input to control processing of the speech of the user 102 and/or the other users 102 of the team.

Figure 2:
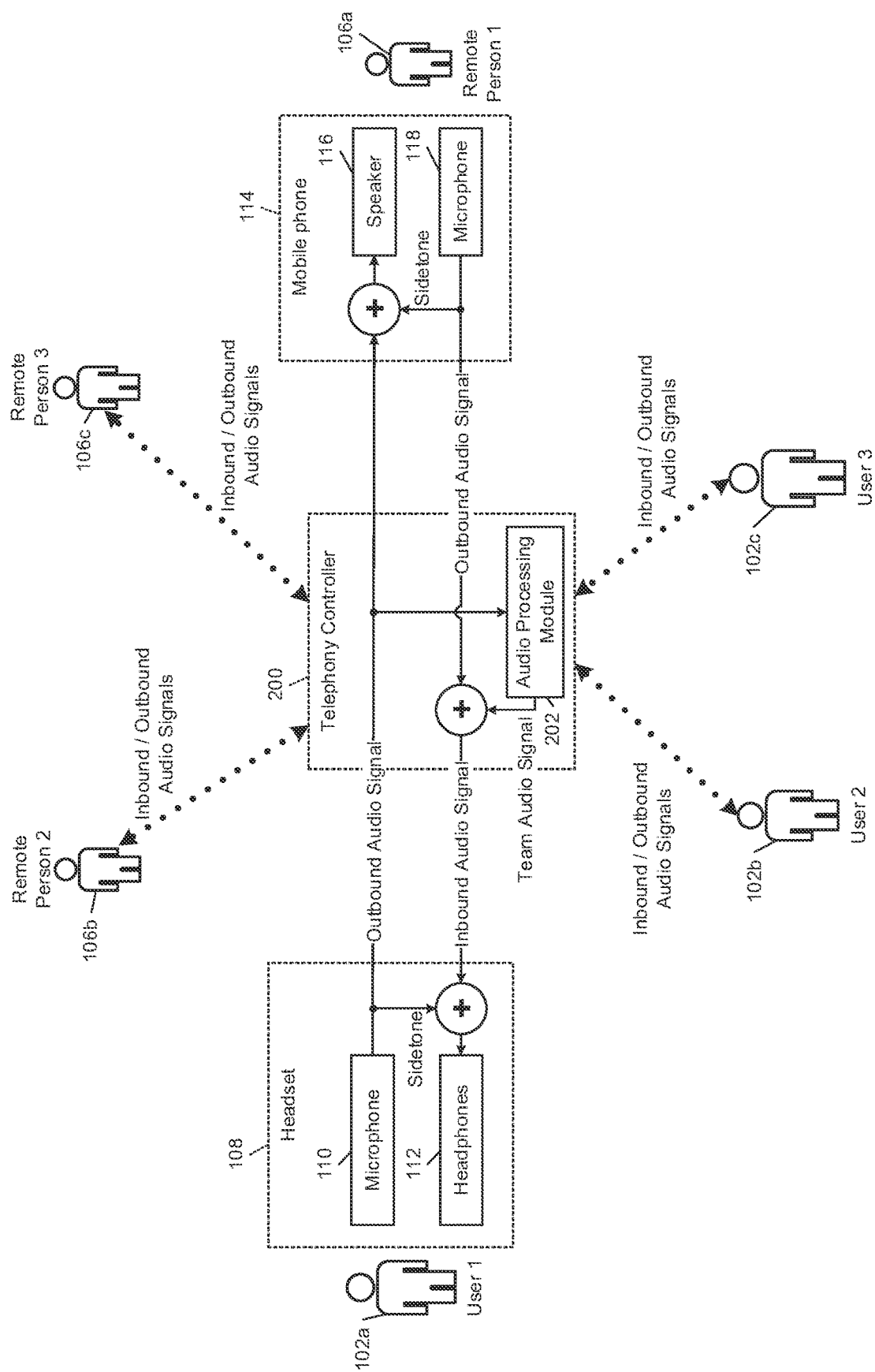
FIG. 2 is a graphical illustration of the telephony controller.

FIG. 2 is a graphical illustration of an example telephony controller 200 that may be implemented in the environments of FIGS. 1A and 1B. For simplicity, the FIG. 2 graphically illustrates a detailed implementation of the telephony controller 200 with respect to the first user 102a and the first remote person 106a. However, the implementation is substantially the same for each of the other users 102b and 102c and corresponding remote persons 106b and 106c. Further, while three users 102 and three remote persons 106 are illustrated in FIG. 2, the telephony controller 200 may be implemented in an environment that supports any desirable number of users or remote persons.

In FIG. 2, telephony controller 200 is configured to receive, for each of the users 102 of the team, an outbound audio signal of the user 102 in the conference between the user and the corresponding remote person 106. The outbound audio signal includes the speech of the user 102 in the conference between the user and the corresponding remote person 106.

Each user 102 is equipped with an audio input/output (IO) device. For illustration, the example audio IO device of each user 102 is a binaural headset 108 with a microphone 110 and set of stereo earphones 112—one earphone for each ear of the user 102.

The binaural headset 108 is configured to receive, from the telephony controller 200 via the communication network 104, an inbound audio signal for the associated user 102 that is based on (or includes) the speech of the remote person 106 (for example, the remote person 106a, etc.) in the corresponding conference between the user 102 and the remote person 106, in addition to the speech of each of the other users 102 of the team (for example, the second and third users 102b and 102c, etc.).

In various embodiments, the binaural headset 108 may be configured to receive the inbound audio signal for the associated user 102, from the telephony controller 200 via the communication network 104, via one or more intermediary communication devices (for example, a personal computer, a laptop, a mobile phone, a telephone (for example, a VoIP phone, a landline phone, etc.) (not shown). The intermediary communication device may be configured to receive the inbound audio signal for the associated user 102 from the telephony controller 200 via the communication network 104 and provide the received inbound audio signal to the binaural headset 108.

In FIG. 2, the binaural headset 108 is configured to, based on the inbound audio signal received for the associated user 102, output, via the headphones or set of stereo earphones 112, the speech of the remote person 106 in the corresponding conference between the user and the remote person 106, in addition to the speech of each other user 102 of the team.

The binaural headset 108 is also configured to collect, via the microphone 110, the speech of the associated user 102 and provide to the telephony controller 200, via the communication network 104, an outbound audio signal for the user 102 that is based on (or includes) the speech of the user 102 in the corresponding conference between the user 102 and the remote person 106.

In various embodiments, binaural headset 108 may be configured to provide the outbound audio signal for the associated user 102, to the telephony controller 200 via the communication network 104, via one or more intermediary communication devices. The intermediary communication device may be configured to, in turn, receive the outbound audio signal for the user 102 and provide the received outbound audio to the telephony controller 200 via the communication network 104.

Further, for simplicity, only the first user 102*a* is illustrated in FIG. 2 as equipped with the binaural headset 108. However, each of the other users 102*b* and 102*c* are equipped with substantially similar binaural headsets. Further, in various environments, the audio IO device of one or more users may be a different type of device (for example, one or more earpieces, such as earbuds, with a microphone, a stand-alone microphone and stand-alone earpiece(s), etc.).

In FIG. 2, each remote person 106 is similarly equipped with an audio IO device. For illustration, the example audio IO device of each remote person 106 is part of a mobile phone 114 that includes a speaker 116 and a microphone 118.

The mobile phone 114 is configured to receive, from the telephony controller 200 via the communication network 104, an inbound audio signal for the associated remote person 106 that is based on (or includes) the speech of the user 102 in the corresponding conference between the user 102 and the remote person 106.

In various embodiments, the mobile phone 114 may be configured to receive the inbound audio signal for the associated remote person, from the telephony controller 200 via the communication network 104, via one or more intermediary communication devices. The intermediary communication device may be configured to receive the inbound audio signal for the remote person 106 from the telephony controller 200 via the communication network 104 and provide the received inbound audio signal to the mobile phone 114.

In FIG. 2, the mobile phone 114 is configured to, based on the inbound audio signal received for the associated remote person 106, output, via the speaker 116, the speech of the user 102 in the corresponding conference between the user 102 and the remote person 106.

The mobile phone 114 is also configured to collect, via the microphone 118, the speech of the associated remote person 106 and provide, to the telephony controller 200 via the communication network 104, an outbound audio signal for the remote person 106 that is based on (or includes) the speech of the remote person 106 in the corresponding conference between the user 102 and the remote person.

In various embodiments, mobile phone 114 may be configured to provide the outbound audio signal for the associated remote person 106, to the telephony controller 200 via the communication network 104, via one or more intermediary communication device. The intermediary communication device may be configured to, in turn, receive the outbound audio signal for the remote person 106 and provide the received outbound audio to the telephony controller 200 via the communication network 104.

Further, for simplicity, only remote person 106*a* is illustrated in FIG. 2 as equipped with the mobile phone 114. However, each of the other remote persons 106*b* and 106*c* are similarly equipped with mobile, landline, or computer-based phones. Further, in various environments, the audio 10 device of one or more remote persons may be a different type of device (for example, a binaural headset, one or more earpieces, such as earbuds, with a microphone, a stand-alone microphone and stand-alone earpiece(s), etc.).

The telephony controller 200 is configured to receive, for each of the users 102 of the team, the outbound audio signal for the user 102 that includes the speech of the user 102 in the conference and, in particular, a one-to-one call, between the user 102 and the corresponding remote person 106. The telephony controller 200 is configured to, for each user 102 of the team, receive the outbound audio signal for the user 102 from the binaural headset 108 of the user 102 via the communication network 104.

The telephony controller 200 is also configured to, for each of the remote persons 106, provide the inbound audio signal for the remote person 106 that includes the speech of the corresponding user 102 in the conference between the corresponding user 102 and the remote person 106. In various implementations, the telephony controller 200 may be configured to generate the inbound signal for the remote person 106 as a new audio signal based on the speech of the corresponding user 102 in the received outbound audio signal for the corresponding user 102 and provide, via the communication network 104, the generated inbound audio signal for the remote person 106 to the remote person 106. Or, the telephony controller 200 may be configured to provide, via the communication network 104, the outbound audio signal for corresponding user 102 to the mobile phone 114 of the remote person 106 as the inbound audio signal for the remote person 106 (for example, without generating a new audio signal, etc.).

The telephony controller 200 is also configured to, for each of the remote persons 106 that are not part of the team, receive the outbound audio signal for the remote person 106 that includes the speech of the remote person 106 in the conference and, in particular, the one-to-one call, between the corresponding user 102 and the remote person 106. The telephony controller 200 is configured to, for each remote person 106, receive the outbound signal for the remote person 106 from the mobile phone 114 of the remote person via the communication network 104.

The telephony controller 200 is configured to, for each user 102 of the team, process, into an inbound audio signal for the user 102, the speech included in the outbound audio signal received for each other user 102 and the speech included in the outbound audio signal received for the corresponding remote person 106 in the conference between user 102 and the corresponding remote person 106.

The telephony controller 200 may include an audio processing module 202. The telephony controller 200 is configured to provide, for each user 102 of the team, to the audio processing module 202, the outbound audio signal received for the user 102 in the conference between the user 102 and the corresponding remote person 106. The audio processing module is configured to, for each user 102 of the team, receive the outbound audio signal for the user 102 and, among other things described in more detail in reference to FIG. 3, combine, for each user 102 of the team, the outbound audio signal received for each of the other users 102 of the team into a team audio signal (broadly, a composite audio signal). The team audio signal, then, includes the speech of each other user 102 of the team.

Figure 3:
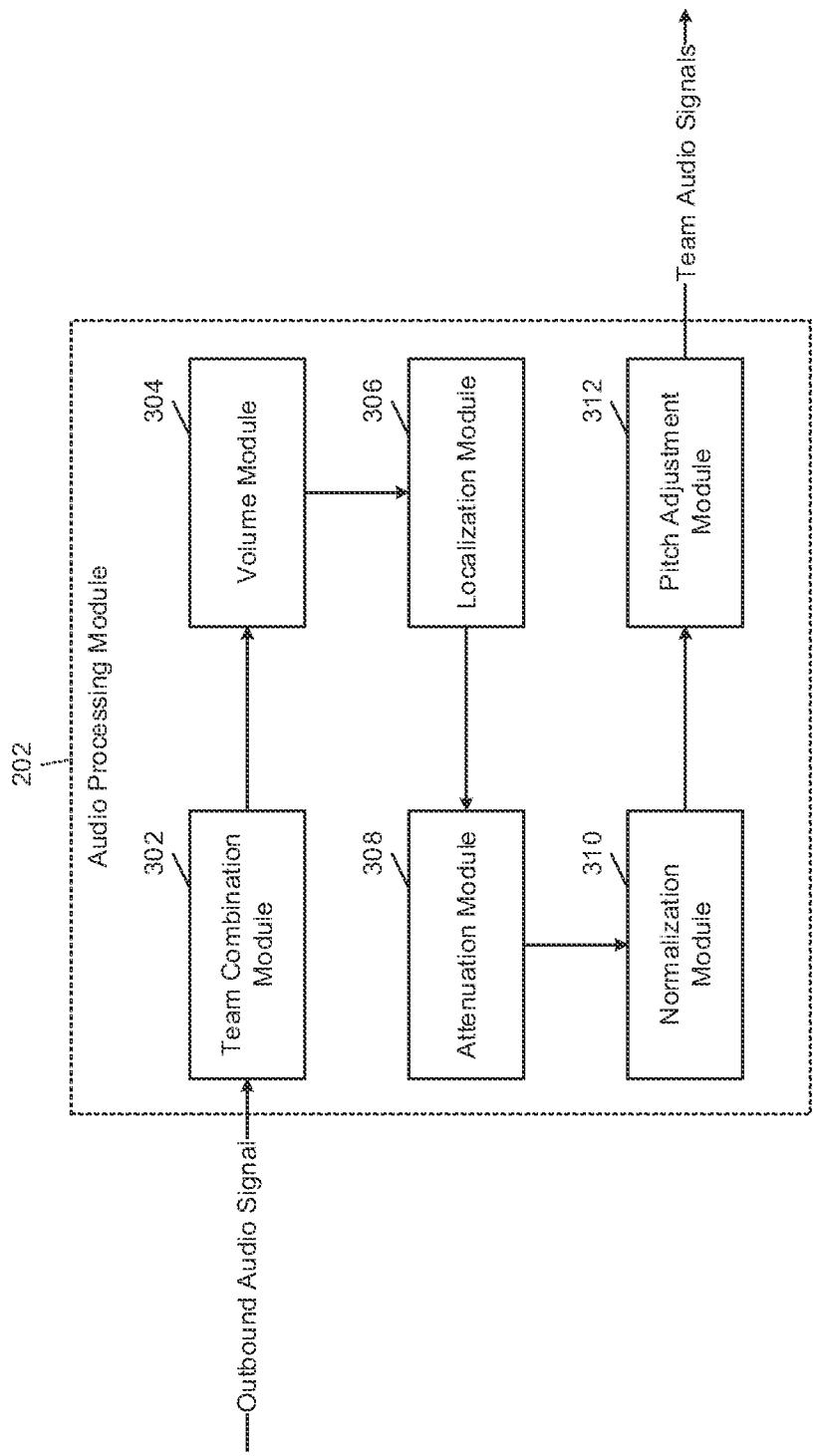
FIG. 3 is a functional block diagram of an audio processing module of the telephony controller.

FIG. 3 is a functional block diagram of an audio processing module 202 of the telephony controller 200. The example audio processing module 202 includes modules configured to, for each user of the team, combine the audio outbound audio signal received for each other user 102 of the team into a team audio signal (broadly, an auxiliary audio signal) for the user 102 and, through various processing techniques describe herein, enable the user 102 to, for example, readily differentiate the speech of each of the other users 102 of the team.

The example modules of the telephony controller 200 include a team combination module 302, a volume module 304, a localization module 306, an attenuation module 308, a normalization module 310, and a pitch adjustment module

312. The audio processing module 202 is configured to, for each user 102 of the team, after receiving the outbound audio signal for each of the other users 102 of the team, provide the outbound audio signal for each other user 102 of the team to the modules and, in particular, the team combination module 302.

The team combination module 302 is configured to, as described above, combine, for each user of the team, the audio outbound audio signal received for each other user 102 of the team into a team audio signal, such that the team audio signal includes the speech of each other user 102 of the team, but not the speech of the corresponding remote persons 106 in the conferences between other users 102 and the correspond remote persons. In this manner, the speech of the other remote persons 106 is isolated from the team audio signal generated for the user 102. The team combination module 302 is then configured to, for each user 102, provide the team audio signal for the user 102 to the volume module 304.

The volume module 304 is configured to, for each user 102 of the team, receive the team audio signal for the user 102 from the team combination module 302 and, in particular, the speech of each other user of the team. The volume module 304 is configured to then lower the volume of the speech of each other user of the team in comparison to the volume of the speech of the corresponding remote person 106 in the conference between the user 102 and the corresponding remote person 106. The volume module 304 is configured to, for each user of the team, provide the volume-adjusted team audio signal for the user 102 to the localization module 306. In various embodiments, the telephony controller 200, the audio processing module 202, and/or the volume module 304 may be configured to additionally or alternatively increase the volume of the corresponding remote person 106, such that the volume of the speech of each other user 102 of the team is lower than the volume of the corresponding remote person 106.

In FIG. 2, the localization module 306 is configured to, for each user 102 of the team, receive the volume-adjusted team audio signal for the user 102 from the volume module 304 and localize the speech of each other user 102 in the team audio signal in a two-dimensional (2D) or three-dimensional (3D) virtual space around a location of the user 102 in the virtual space. The localization module 306 is configured to, for each user 102 of the team, provide the localized team audio signal for the user 102 to the attenuation module 308.

The localization module 306 may be configured in various embodiments to convert the team audio signal to a stereo audio signal, such that the team audio signal creates an illusion of multi-directional audible perspective, and direct or associate within the stereo-ized team audio signal certain sounds of the speech of each other user 102 to one earphone of the binaural headset 108 of the user 102 and other sounds of the speech of each other user 102 to the other earphone of the binaural headset 108 of the user 102. In other embodiments, the team audio signal received from the volume module 304 may already be a stereo audio signal, in which case the localization module 306 may be configured to adjust the earphone associations within the team audio signal.

Further, the localization module 306 may be configured in various embodiments to creates the illusion of multi-directional audible perspective for the speech of each other user 102 (or certain sounds thereof) by creating a delay in time between certain sounds of the speech of each other user 102 that are directed to or associated with one earphone of the binaural headset of the user 102 and other sounds of the speech of each other user 102 that are directed to or associated with the other earphone of binaural headset of the user 102.

In various embodiments, the virtual space represents a physical location such as an office space for a call center that includes multiple offices, cubicles, desks, work stations, etc. of the users 102. In this manner, the localization module 306 may, for example, be configured to, for the first user 102a of the team, localize the speech of the second user 102b in a virtual space (representing the office space for the call center) to a location within the virtual space that represents the physical location of a desk of the second user 102b in the office space for the call center, where a different location in the in the virtual space represents a physical location of a cubicle of the first user in the office space for the call center (for example, ten feet away from the desk of the second user 102a, etc.).

In FIG. 3, the attenuation module 308 is configured to, for each user 102 of the team, receive the localized team audio signal for the user 102 from the localization module 306 and attenuate the speech of each other user 102 based on the location of the other user 102 within the virtual space and, in particular, the distance between the location of the user 102 in the virtual space and the location of the other user 102 in the virtual space, such that one other user 102 (for example, the second user 102b, etc.) positioned farther away than another user 102 (for example, the third user 102c, etc.) will sound softer to the user 102. The attenuation module 308 is configured to, for each user 102 of the team, provide the attenuated team audio signal for the user 102 to the normalization module 310.

The normalization module 310 is configured to, for each user 102 of the team receive the attenuated team audio signal for the user 102 from the attenuation module 308 and normalize the speech of each other user 102 in the team audio signal. The normalization module 310 is configured, for each user 102 of the team, to provide the normalized team audio signal to the pitch adjustment module 312.

In various embodiments, the normalization module 310 may be configured to average the volume of the speech of the other users 102 in the team audio signal and normalize the volume of the speech of each other user 102 based on the average volume (for example, normalize the volume of all over the other users 102b and 102c to the average volume, etc.), in order to help ensure that "loud talkers" do not over power "soft talkers." The normalization module 310 may alternatively or additionally be configured in various embodiments to, for each user 102 of the team, calculate the standard deviation of the volume of the speech of each other user 102 of the team in the team audio signal and normalize the speech of each other user 102 in the team audio signal based on the average volume and/or the standard deviation.

In various embodiments, the normalization module 310 may be configured to continuously train a machine learning model using the speech of the users 102 in the outbound audio signals for the users 102 received by telephony controller 200, such that the trained model is indicative of the average volume of the speech and/or the standard deviation of the speech of the users 102. The normalization module 310 may then be configured to, for each user 102 of the team, normalize, based on the trained machine learning model, the speech of each of the other users 102 in the team audio signal.

Alternatively or additionally, the normalization module 310 may be configured to, for each user 102 of the team, dynamically clip or compress the speech of the other users 102 in the team audio signal, such that the maximum volume of the speech of the other users 102 is the same or similar, in order to help limit loud noises (for example, to prevent startling and/or interruptions to the first user 102*a*, if the voice of the second or third user 102*b* or 102*c* is temporarily raised, etc.).

The pitch adjustment module 312 is configured to, for each user 102 of the team, receive the normalized team audio signal for the user 102 and adjust the pitch of the speech of one or more other users 102. The pitch adjustment module 312 may be configured to increase or decrease the pitch of the of each other user 102 and/or vary the pitch of the speech of each of the other users 102 in order to make the speech of each other user 102 in the team audio signal more distinguishable to the user 102. The pitch adjustment module 312 is configured to, for each user 102 of the team, provide the pitch-adjusted team audio signal as an output for use by the audio processing module 202 as described below.

In various embodiments the team combination module 302, the volume module 304, the localization module 306, the attenuation module 308, the normalization module 310, and the pitch adjustment module 312 may be generally configured to process, operate on, etc. the outbound audio signals received for each user of the team and the team audio signal for each user of the team, as described above, in any order or even simultaneously. Further, one or more modules may take the form of a single module.

Referring again to FIG. 2, the telephony controller 200 is configured to, for each user 102 of the team, generate an inbound audio signal for the user 102 based on the team audio signal for the user 102 and the outbound audio signal for the corresponding remote person 106 in the conference between the user 102 and the corresponding remote person 106, such that the inbound audio signal for the user 102 includes the speech of each other user 102 of the team and the speech of the corresponding remote person 106. The telephony controller 200 is configured to, for each user 102 of the team, provide the inbound audio signal for the user 102 to the binaural headset 108 of the user 102 via the communication network 104. In various embodiments, the is configured to, for each user 102 of the team, generate the inbound audio signal or the user 102 by combining the team audio signal for the user 102 with the outbound audio signal for the corresponding remote person 106.

Figure 4:
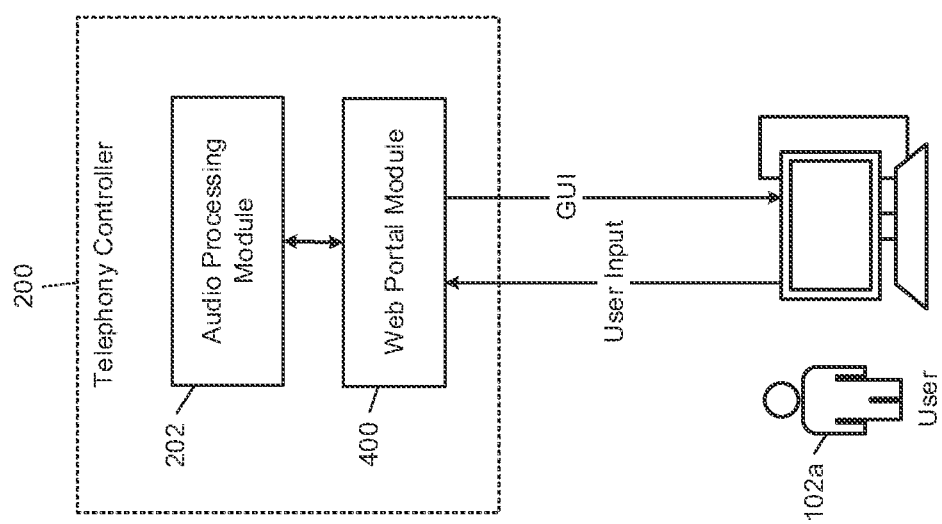
FIG. 4 is a functional block diagram of a portal module of the telephony controller.

In various embodiments, the telephony controller 200 may further include a portal module (not shown in FIG. 2). FIG. 4 is a functional block diagram of an example portal module 400 of the telephony controller 200. In various embodiments, however, the portal module 400 need not necessarily be part of the telephony controller 200. For example, the portal module 400 may be located remote from the telephony controller 200 and in communication with the telephony controller 200 via the communication network 104. Further, while FIG. 4 illustrates only the first user 102*a*, the portal module 400 is similarly configured for the second and third users 102*b* and 102*c*. Further, the portal module 400 may be configured in various embodiments to support any desirable number of users.

In FIG. 4, the example portal module 400 is a web portal module. The portal module 400 is configured to, for each user of the team, provide options to the user 102 to control processing of the team audio signal for the user 102 and/or the team audio signals for the other users 102 and, thus, the inbound audio signal for the user 102 and the inbound audio signals for the other users 102.

In various implementations, the portal module 400 may be configured to, for each user 102 of the team, transmit the options, via the communication network 104 in the form of a graphical user interface (GUI) for the portal module 400 (broadly, a portal GUI), to a computer (such as, a PC, laptop, mobile phone, etc.) associated with the user 102 (for example, in the form of one or more web pages, etc.). The portal GUI is then configured to, for each user 102 of the team, receive input from the user 102 in response to the options and transmit the user input to the portal module 400 via the communication network 104. The portal module 400 is configured to, for each user of the team, receive user input and provide the user input to the audio processing module 202. The audio processing module 202 is configured to, for each user of the team, receive the user input from the portal module 400 and control the processing of the team audio signals for the user 102 and/or the other users 102 of the team based on the user input.

In various embodiments, the processing control options for each user 102 of the team may include an option for the user to mute their speech in the team audio signals for the other users 102, whereby conference is entirely private between the user 102 and the corresponding remote person in the conference between the user 102 and the corresponding remote person 106.

In various embodiments, the processing control options may include an option for each user 102 to temporarily mute the speech of one or more other users 102 in the team audio signal for the user 102.

In various embodiments, the processing control options may include an option for the user 102 to tailor injection parameters for the microphone 110 of the user 102 and/or the microphones 110 of other users 102. For example, the processing control options may include an option for each user 102 of the team, to select, specify, define, etc. the other users 102 of the team and/or adjust the volume of the speech of one or more other users 102.

The processing control options for each user 102 may include an option for the user 102 to specify, define, adjust, etc. the virtual location of the user 102 within the virtual space and/or the virtual location of one or more other users 102 within the virtual space.

The processing control options may include options for each user 102 to apply various filters to the team audio signals for the user 102 and/or the other users 102. For example, these filters may increase or decrease the pitch of the speech of the user 102 in the team audio signals for the other users or the pitch of the speech of the other users 102 in the team audio signal for the user 102.

In various embodiments, the binaural headset 108 of each user 102 may include a physical button or switch. The binaural headset 108 may be configured to, for each user 102 of the team, transmit via the communication network 104, a mute signal to the telephony controller 200 or the audio processing module 202 in response to the user 102's actuation of the button or switch. The telephony controller 200 or the audio processing module 202 may be configured to, for each user 102 of the team receive the mute signal and, in response to the mute signal, mute the speech of the user 102 in the team audio signals for the other users 102 of the team.

The example embodiments described herein may be deployed in any suitable implementation, such as a browser client plug-in that runs on a computing device, a standalone application, in a software-as-a-service (SaaS) implementation, in a server cloud-based implementation, etc.

Flowchart

Figure 5:
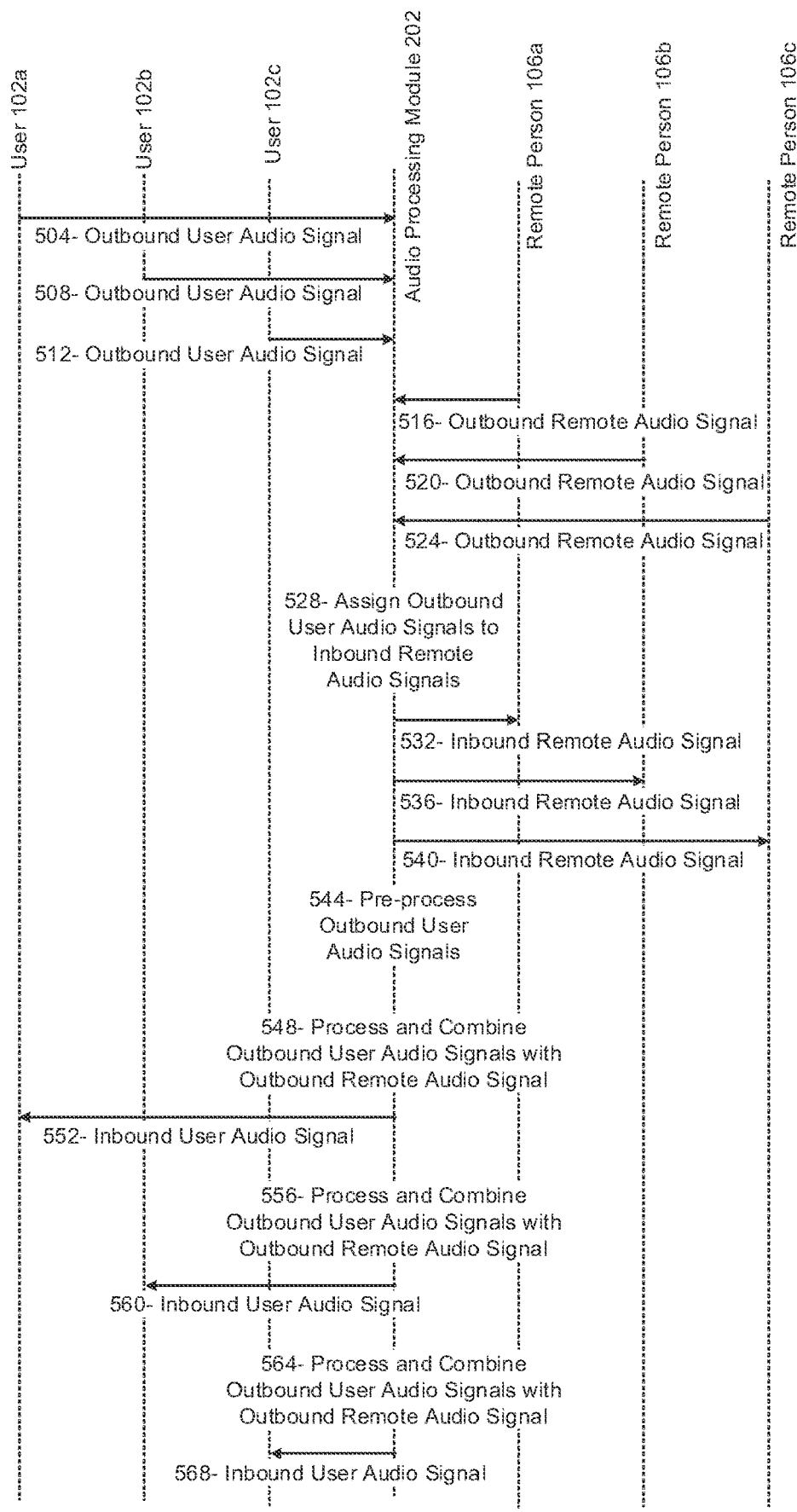
FIG. 5 is a message sequence chart of example signal processing that may be implemented in connection with the telephony controller of FIGS. 2-4.

FIG. 5 is a message sequence chart visually demonstrating example signals and processing used in distributing audio signals in a team conferencing environment. The signals are shown and described with respect to the users 102, the binaural headsets 108, the remote persons 106, the mobile phones 114, the audio processing module 202, and the communication network 104. However, the signals are not limited to the environment 101, the telephony controller 200, or any other entities of FIGS. 1A-4. For the sake of illustration, the example environment of FIG. 1B describes the users 102 as being in respective conversations with the remote persons 106.

The audio processing module 202 receives outbound user audio signals from the team members—specifically, an outbound audio signal from the user 102a is received at 502, an outbound audio signal from the user 102b is received at 504, and an outbound audio signal from the user 102c is received at 506. While the users 102 are shown for convenience, the audio signals themselves are generated by their telephones based on microphone inputs from the binaural headsets 108.

The audio processing module 202 also receives outbound remote audio signals from the team members—specifically, an outbound audio signal from the remote person 106a is received at 516, an outbound audio signal from the remote person 106b is received at 520, and an outbound audio signal from the remote person 106c is received at 524.

At 528, the audio processing module 202 assigns the outbound user audio signals from the users 102 to the remote persons 106 and outputs respective inbound remote audio signals to the remote persons 106 at 532, 536, and 540. Since the conversations between the users 102 and the remote persons 106 are one-to-one, each outbound user audio signal is simply mapped to the corresponding inbound remote audio signal.

Note that the terms "inbound" and "outbound" are used with respect to the phone's communication with the network. Inbound signals are therefore signals received by the phone for outputting to the user through a speaker (for example, through a handset speaker, speakerphone, headset, etc.).

Correspondingly, outbound signals are signals acquired by a phone's microphone (for example, a microphone physically located on the phone or a microphone integrated into a wired or wireless headset) that are being transferred to the network for processing and/or delivery to another phone.

At 544, the audio processing module 202 pre-processes the outbound user audio signals, which may include normalizing volumes, removing spikes, and applying corrections. For example, the corrections may make voices easier to understand or remove distracting vocal sibilance, such as with a high-pitch filter. In various implementations, the normalizing and corrections are particularly tailored to each of the users. For example, settings may be manually controlled, adaptive filtering may be implemented, and/or machine learning models may be trained and employed.

At 548, the audio processing module 202 further processes the pre-processed outbound user audio signals particularly for the user 102a—omitting the outbound user audio signal from the user 102a. For example, the audio processing module 202 may adjust the outbound user audio signals (from the user 102b and the user 102c) to place them in a virtual 2D or 3D space with respect to the user 102a. This adjustment may include attenuation based on distance between the other user and the user 102a in the virtual space. The adjustment may also adjust the timbre of each of the other users higher or lower to assist with differentiation between voices.

The audio processing module 202 combines the processed outbound user audio signals with the outbound remote audio signal from the remote person 106a. For example, linear superposition may be used to perform the combination. At 552, this combined signal is transmitted to the user 102a as an inbound user audio signal.

Similarly, at 556, the audio processing module 202 further processes the pre-processed outbound user audio signals particularly for the user 102b omitting the outbound user audio signal from the user 102b. The audio processing module 202 combines the processed outbound user audio signals with the outbound remote audio signal from the remote person 106b and, at 560, transmits this combined signal to the user 102b as an inbound user audio signal.

Similarly, at 564, the audio processing module 202 further processes the pre-processed outbound user audio signals particularly for the user 102c omitting the outbound user audio signal from the user 102c. The audio processing module 202 combines the processed outbound user audio signals with the outbound remote audio signal from the remote person 106c and, at 556, transmits this combined signal to the user 102c as an inbound user audio signal.

This signal processing is repeatedly performed to provide audio content to the users 102 and the remote persons 106 that appears continuous and seamless. In various implementations, the audio signals take the form of VoIP packets. There is no guarantee of one-to-one correspondence between an outbound packet from the user 102a and an inbound packet to the user 102a. However, in various implementations, an outbound packet received at 504 from the user 102a may be transmitted at 532 directly to the remote person 106a. For the pre-processing and processing of 544, 548, 556, and 564, the outbound user audio signals may be reassembled into time domain data and then processed as time series data before being turned back into discrete packets for transmission.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A method for distributing audio signals among a plurality of communication devices that respectively correspond to a plurality of users, the method comprising:

during an audio connection between a first user of the plurality of users and a remote person, receiving a first outbound signal, wherein the first outbound signal encodes audio being transmitted to a remote communication device of the remote person from a first communication device of the plurality of communication devices, wherein the first communication device corresponds to the first user;

receiving a first inbound signal, wherein the first inbound signal encodes audio being transmitted to the first communication device from the remote communication device;

receiving a set of outbound signals from at least one of the plurality of communication devices other than the first communication device;

generating a first combined signal by combining the set of outbound signals with the first inbound signal; and transmitting the first combined signal to the first communication device, wherein each of the plurality of communication devices other than the first communication device is represented at a different location in a virtual space around binaural headphones of the first communication device, and each individual outbound signal in the combined signal is assigned to a different spatial direction corresponding to the location in the virtual space of the communication device generating the individual outbound signal.

2. The method of claim 1 further comprising forwarding the first outbound signal to the remote communication device.

3. The method of claim 1 further comprising:
generating a second combined signal by combining the set of outbound signals excluding a second outbound signal, wherein the second outbound signal encodes audio from a second communication device corresponding to a second user; and
transmitting the second combined signal to the second communication device.

4. The method of claim 1 wherein generating the first combined signal includes combining the set of outbound signals with corresponding time delays for a subset of outbound signals included in the first combined signal.

5. The method of claim 4 wherein the corresponding time delays prevent the set of outbound signals included in the first combined signal from overlapping.

6. The method of claim 4 further comprising:
for each outbound signal of the set of outbound signals included in the first combined signal, adjusting a volume of the outbound signal based on the first inbound signal.

7. The method of claim 6 wherein adjusting the volume of each outbound signal of the set of outbound signals includes implementing a machine learning algorithm to normalize each outbound signal of the set of outbound signals included in the first combined signal.

8. The method of claim 1 further comprising:
transmitting the first outbound signal to a set of remote communication devices.

9. The method of claim 1 wherein the first communication device includes:
binaural headphones for receiving the first combined signal, and
a microphone for transmitting the first outbound signal.

10. A system for distributing audio signals among a plurality of communication devices that respectively correspond to a plurality of users, the system comprising:

at least one processor; and
a memory coupled to the at least one processor,
wherein the memory stores instructions for execution by the at least one processor; and
wherein the instructions include,
during an audio connection between a first user of the plurality of users and a remote person, receiving a first outbound signal, wherein the first outbound signal encodes audio being transmitted to the remote person from a first communication device corresponding to the first user;

receiving a first inbound signal, wherein the first inbound signal encodes audio being transmitted to the first user from a remote communication device of the remote person;

receiving a set of outbound signals from at least one of the plurality of communication devices other than the first communication device;

generating a first combined signal by combining the set of outbound signals with the first inbound signal; and transmitting the first combined signal to the first communication device, wherein each of the plurality of communication devices other than the first communication device is represented at a different location in a virtual space around binaural headphones of the first communication device, and each individual outbound signal in the combined signal is assigned to a different spatial direction corresponding to the location in the virtual space of the communication device generating the individual outbound signal.

11. The system of claim 10 wherein the instructions include:
transmitting the first outbound signal to the remote communication device corresponding to the remote person.

12. The system of claim 10 wherein the instructions include:
generating a second combined signal by combining the set of outbound signals excluding a second outbound signal, wherein the second outbound signal encodes audio from a second communication device corresponding to a second user, and
transmitting the second combined signal to the second communication device.

13. The system of claim 10 wherein generating the first combined signal includes combining the set of outbound signals with corresponding time delays for a subset of outbound signals included in the first combined signal.

14. The system of claim 13 wherein the corresponding time delays prevent the set of outbound signals included in the first combined signal from overlapping.

15. The system of claim 13 wherein the instructions include:
for each outbound signal of the set of outbound signals included in the first combined signal, adjusting a volume of the outbound signal based on the first inbound signal.

16. The system of claim 15 wherein adjusting the volume of each outbound signal of the set of outbound signals includes implementing a machine learning algorithm to normalize each outbound signal of the set of outbound signals included in the first combined signal.

17. The system of claim 10 wherein the instructions include:
transmitting the first outbound signal to a set of remote communication devices.

18. The system of claim 10 wherein the first communication device includes:
- binaural headphones for receiving the first combined signal, and
- a microphone for transmitting the first outbound signal.

19. The system of claim 10, wherein the first combined signal excludes inbound signals transmitted to the plurality of communication devices other than the first communication device.

20. The system of claim 10, wherein the first combined signal includes at least one of the inbound signals transmitted to the plurality of communication devices other than the first communication device.

* * * * *